L. H. LAMKIN.
QUICK DETACHABLE WHEEL TIRE.
APPLICATION FILED SEPT. 29, 1910.

991,328.

Patented May 2, 1911.

Witnesses

Lewis H. Lamkin
Inventor
by C. A. Snow & Co.
Attorneys

UNITED STATES PATENT OFFICE.

LEWIS HENRY LAMKIN, OF NATCHEZ, MISSISSIPPI.

QUICK-DETACHABLE WHEEL-TIRE.

991,328.

Specification of Letters Patent. Patented May 2, 1911.

Application filed September 29, 1910. Serial No. 584,511.

*To all whom it may concern:*

Be it known that I, LEWIS HENRY LAMKIN, a citizen of the United States, residing at Natchez, in the county of Adams and State of Mississippi, have invented a new and useful Quick-Detachable Wheel-Tire, of which the following is a specification.

This invention relates to tires for use upon the wheels of motor vehicles and the like and its object is to provide a tire made up of springs and which has the appearance of and constitutes an efficient substitute for the ordinary pneumatic tire, it being possible to use the said tire in connection with the ordinary clencher or quick detachable clencher rims.

Another object is to provide a tire made up of coiled and bowed springs arranged in a novel manner so as to properly absorb the vibrations and jolts produced by the movement of the tire over a rough or irregular surface.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

Figure 1:
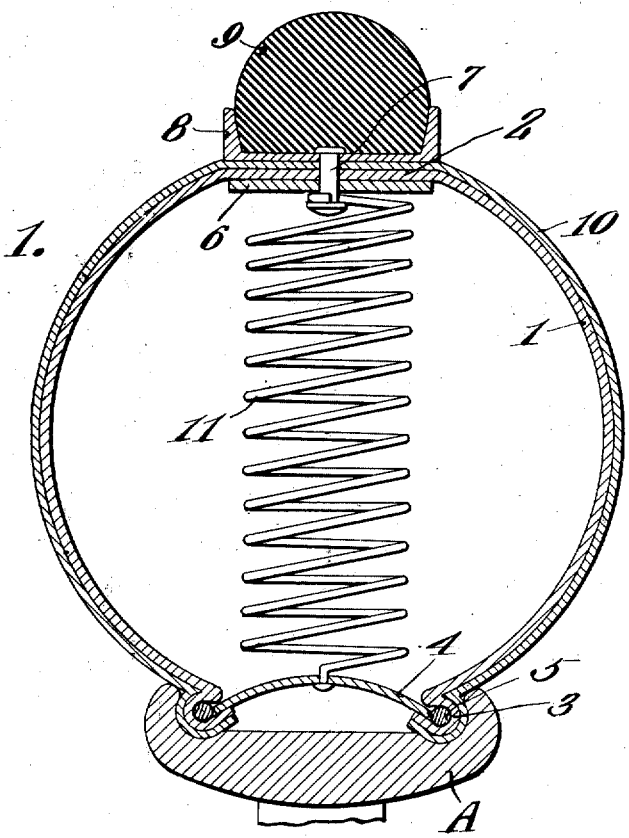
Figure 2:
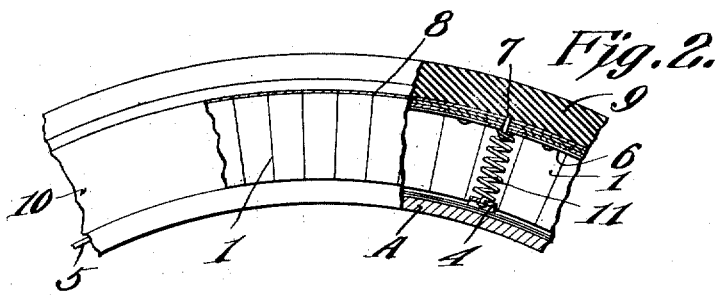

In said drawings:—Figure 1 is a transverse section through a tire constructed in accordance with the present invention, said tire being shown in engagement with the rim of a wheel. Fig. 2 is a view on a reduced scale of a portion of the tire, showing the same partly in elevation and partly in section.

Referring to the figures by characters of reference 1 designates bow springs constituting the main body of the tire, each of these springs being flat at its center as indicated at 2 in Fig. 1, and being tapered from said flat portion toward the ends of the spring, the terminals of said spring being hooked as shown at 3, so as to receive the ends of spring spacing plates 4 which are bowed, as shown. The outer or convex faces of these hooked portions of the various springs 1 coöperate to form annular beads adapted to be seated within the rim A of a vehicle wheel in the same manner as the ordinary clencher or quick detachable clencher tire. Metal rings 5 are arranged within the hooks 3 and are held against displacement by the spacing strips 4 as will be apparent by referring to Fig. 1, it being obvious that these rings must be split to enable them to be sprung on to the wheel rim. The intermediate flat portions 2 of the various springs 1 are held together by an endless band 6 which contacts with the inner faces of these flat portions and is secured to said flat portions by means of rivets 7 or the like extending through the springs 1 and also through an annular channeled ring or hoop 8 arranged upon the outer faces of the springs 1. This ring 8 is adapted to contain a tread portion 9 of rubber or the like which may be cemented or otherwise secured within the ring and a jacket or covering 10 of leather or other suitable flexible material may be extended between the springs 1 and the ring 8 and also throughout the length of the said springs 1 and thus give the tire body the appearance of an ordinary pneumatic tire.

Coiled springs 11 are interposed between the strips 4 and the interior band 6, the inner ends of these springs being attached to the middle portions of the strips 4, while the outer ends of these springs are connected to the rivets 7.

In placing the tire upon a clencher or quick detachable clencher rim A the hooked portions of these springs 1 are pressed toward each other so as to buckle or bow the strips 4. Said hooked portions can then be placed in the groove in the rim and, when released, will spring laterally into engagement with the rim, the strip 4 serving to maintain them in such position. The edge portions of the cover 10 will of course be clamped between the rim 1 and the hooked portions 3 and thus held. The tread portion 9 receives all of the wear to which the tire is subjected and the springs 1, assisted by the cushioning springs 11, operate to take up all jolts and vibrations produced by the movement of the tire over a rough or uneven surface.

What is claimed is:—

A tire including connected bowed members having hooked rim engaging terminals, rings housed within the terminals, bowed spring spreading devices seated at their ends within the hooked terminals and bearing against the rings to hold them against displacement within said terminals, and springs interposed between said spreading means and the middle portions of the resilient members.

In testimony that I claim the foregoing as my own, I have hereto affixed my signature in the presence of two witnesses.

LEWIS HENRY LAMKIN.

Witnesses:
RICHARD F. REED,
PHILIP BEEKMAN.

Copies of this patent may be obtained for five cents each, by addressing the " Commissioner of Patents, Washington, D. C."